United States Patent
Yasnogorodskiy et al.

(10) Patent No.: US 10,041,591 B2
(45) Date of Patent: Aug. 7, 2018

(54) TRANSMISSION PARK MECHANISM

(71) Applicant: Ford Global Technologies, LLC, Dearborn, MI (US)

(72) Inventors: Vladimir Yasnogorodskiy, Sterling Heights, MI (US); David P. Aeschliman, Whitmore Lake, MI (US); Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 14/797,205

(22) Filed: Jul. 13, 2015

(65) Prior Publication Data
US 2017/0016532 A1    Jan. 19, 2017

(51) Int. Cl.
*F16H 63/34* (2006.01)

(52) U.S. Cl.
CPC ..... *F16H 63/3433* (2013.01); *F16H 63/3483* (2013.01)

(58) Field of Classification Search
CPC .................................................. F16H 63/3433
See application file for complete search history.

(56) References Cited

U.S. PATENT DOCUMENTS

| 6,481,556 B1 | 11/2002 | Haupt |
| 7,934,590 B2 | 5/2011 | Duhaime et al. |
| 2008/0169168 A1* | 7/2008 | Nishimura .......... F16H 63/3416 192/219.5 |
| 2010/0108460 A1* | 5/2010 | Nakamura .......... F16H 63/3416 192/219.5 |

FOREIGN PATENT DOCUMENTS

WO    2004031623 A1    4/2004

* cited by examiner

*Primary Examiner* — Terence Boes
(74) *Attorney, Agent, or Firm* — James Dottavio; Brooks Kushman P.C.

(57) ABSTRACT

A park-by-wire system uses a single spring to bias the system towards park and to permit a ratcheting feature which delays the engagement of park until vehicle speed drops below a threshold. A cam slides with respect to a rod. A stop on the rod limits travel in one direction. The spring biases the cam toward the stop but compresses as necessary to allow the cam to move during ratcheting operation. The spring reacts against the housing. Acting through the cam and the stop, the spring biases the rod toward the park position. The design limits the number of components that move during ratcheting operation. Specifically, the rod and actuator do not oscillate during ratcheting operation.

14 Claims, 4 Drawing Sheets

TRANSMISSION PARK MECHANISM

TECHNICAL FIELD

This disclosure relates to the field of automatic transmissions for motor vehicles. More particularly, the disclosure pertains to a park mechanism.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

FIG. 1 illustrates a powertrain 10 with a transmission 12 incorporating a park-by-wire system. The flow of mechanical power is illustrated by solid lines, while dashed lines indicate the flow of information signals. Power is generated by engine 14 and conveyed to a transmission input shaft 16. A torque converter 18 and gearbox 20 modify the speed and torque at which the power is delivered to match vehicle requirements while permitting engine 14 to run at a suitable crankshaft speed. Other types of transmissions may utilize other types of ratio manipulation devices. Driveshaft 22 transfers power from transmission 12 to differential 24. Differential 24 distributes the power between drive wheels 26 and 28 while allowing slight speed differences such as when turning a corner. Some transmissions, such as front wheel drive transaxles, may include the differential in the same housing with the gearbox and torque converter. In such transmissions, power transfer to the differential may utilize gears or chains as opposed to a driveshaft. In some vehicles, a transfer case may be interposed between the transmission and differential to transfer some power to additional wheels.

Torque converter 18 includes an impeller driven by the input shaft 16 which hydro-dynamically drives a turbine. Torque is transferred from the impeller to the turbine whenever the turbine is rotating slower than the impeller, including when the turbine is stationary. Torque converter 18 also includes a stator such that the torque exerted on the turbine may be a multiple of the torque exerted by the impeller on the input shaft. The torque converter may also include an actively controlled lock-up clutch to allow efficient transfer of torque without any speed difference between the impeller and the turbine. The gearbox may be a discrete ratio gearbox that selects is capable of establishing various power flow paths with various speed ratios by selectively engaging various combinations of clutches. Alternatively, the gearbox may include a continuously variable ratio mechanism.

Transmission controller 30 adjusts the state of transmission 12 based on various inputs, including vehicle speed measurements, driver torque demand as indicated by accelerator pedal position, and shift selector 32. The driver uses the shift selector to indicate the desire to move forwards (D) or backwards (R) for example. Controller 30 may adjust the state of the transmission by sending signals to valve body 34. In response to these signals, valve body 34 adjusts the pressure in hydraulic circuits to engage particular clutches, such as clutches within gearbox 20 and the torque converter lock-up clutch.

Park mechanism 36 is engaged in response to driver selection of park (P) via shift selector 32 in order to prevent vehicle movement when the vehicle is unoccupied. The park mechanism must be designed such that, once engaged, the system stays engaged without any vehicle power. In some vehicles, the park mechanism is mechanically linked to the shift selector 32. However, in a park-by-wire system, transmission controller 30 engages and disengages park mechanism 36 in response to an electrical signal from the shift selector 32. Controller 30 may control the park mechanism indirectly by sending electrical signals to valve body 34 that result in hydraulic or mechanical signals to the park mechanism 36.

SUMMARY OF THE DISCLOSURE

A transmission includes a housing, a park gear, a pawl, a rod, a cam, and a spring. The park gear is fixedly driveably connected to an output shaft. The pawl is supported by the housing to pivot between and engaged position and a disengaged position. In the engaged position, the pawl engages the park gear to prevent rotation of the output shaft. In the disengaged position, the output shaft may rotate with respect to the housing. The rod is supported to slide axially with respect to the housing between a park position and a no-park position. An actuator, such as a hydraulic valve, may be configured to pull the rod toward the no-park position. A controller may be programmed to command the actuator to pull the rod toward the no-park position in response to a signal from a shift lever position sensor. The cam is supported to slide axially with respect to the rod between an extended position and a retracted position. A stop prevents movement beyond the extended position. Whenever the rod is in the park position with the cam in the extended position, the cam holds the pawl in the engaged position. Whenever the rod is in the non-park position, the pawl is free to pivot into the disengaged position. The spring reacts against the housing biasing the cam toward the extended position and biasing the rod toward the park position. The spring may be a coil spring with the rod extending through the spring.

A park mechanism includes a rod, a cam, and a first spring. The rod is supported to slide with respect to a housing between a park position and a no-park position. The cam is supported to slide with respect to the rod between an extended position and a retracted position. The first spring reacts against the housing to bias the cam toward the extended position and to bias the rod toward the park position. A pawl may be supported to pivot between an engaged position and a disengaged position. In the engaged position, the pawl engages a park gear to prevent rotation of the park gear. In the disengaged position, the park gear is free to rotate. The cam may hold the pawl in the engaged position whenever the cam is in the extended position and the rod is in the park position. A second spring may bias the pawl toward the disengaged position. An actuator may be configured to pull the rod toward the non-park position in response to a signal from a controller.

A park mechanism includes a rod and a first spring. The rod is supported to move between a park position and a no-park position. The rod has a stop that constrains relative movement of a cam with respect to the rod. Whenever the rod is in the park position and the cam is against the stop, the cam holds a pawl in engagement with a park gear. A second spring may force the pawl out of engagement with the park gear. An actuator may pull the rod toward the no-park position in response to a signal from a controller.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
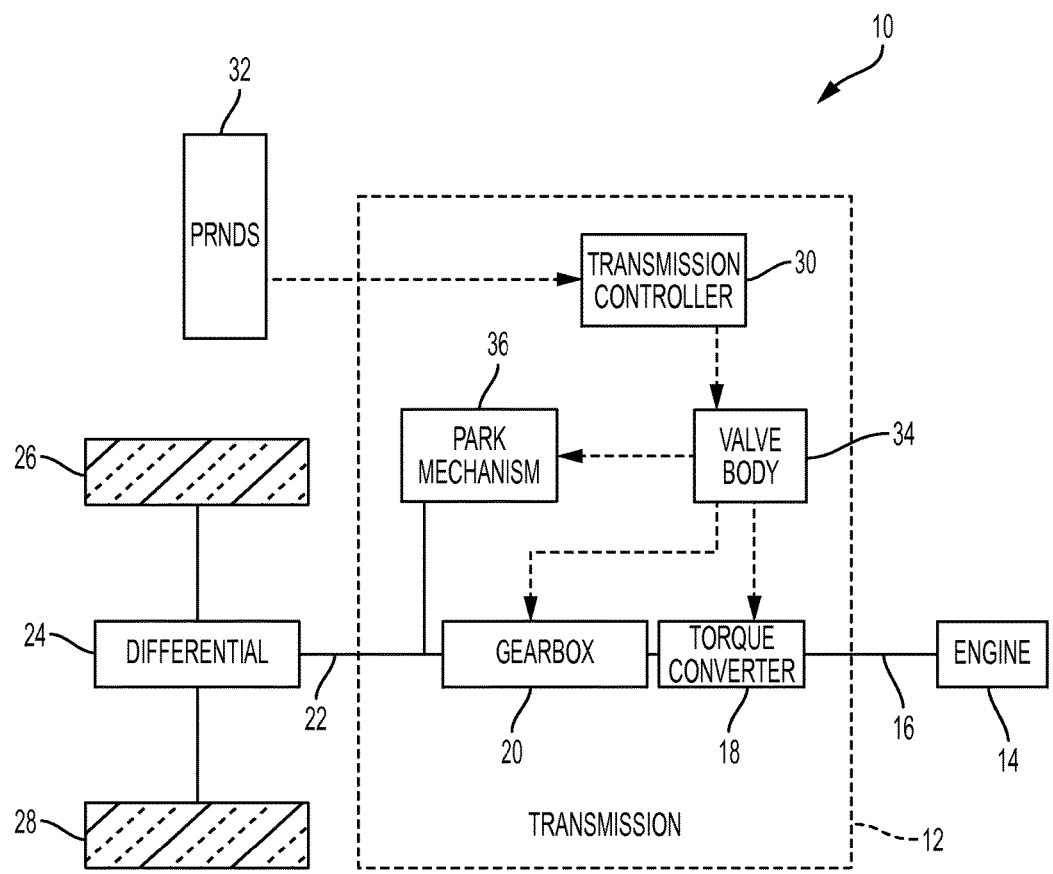
FIG. 1 is a schematic diagram of a vehicle having a transmission with a park-by-wire system.
Figure 2:
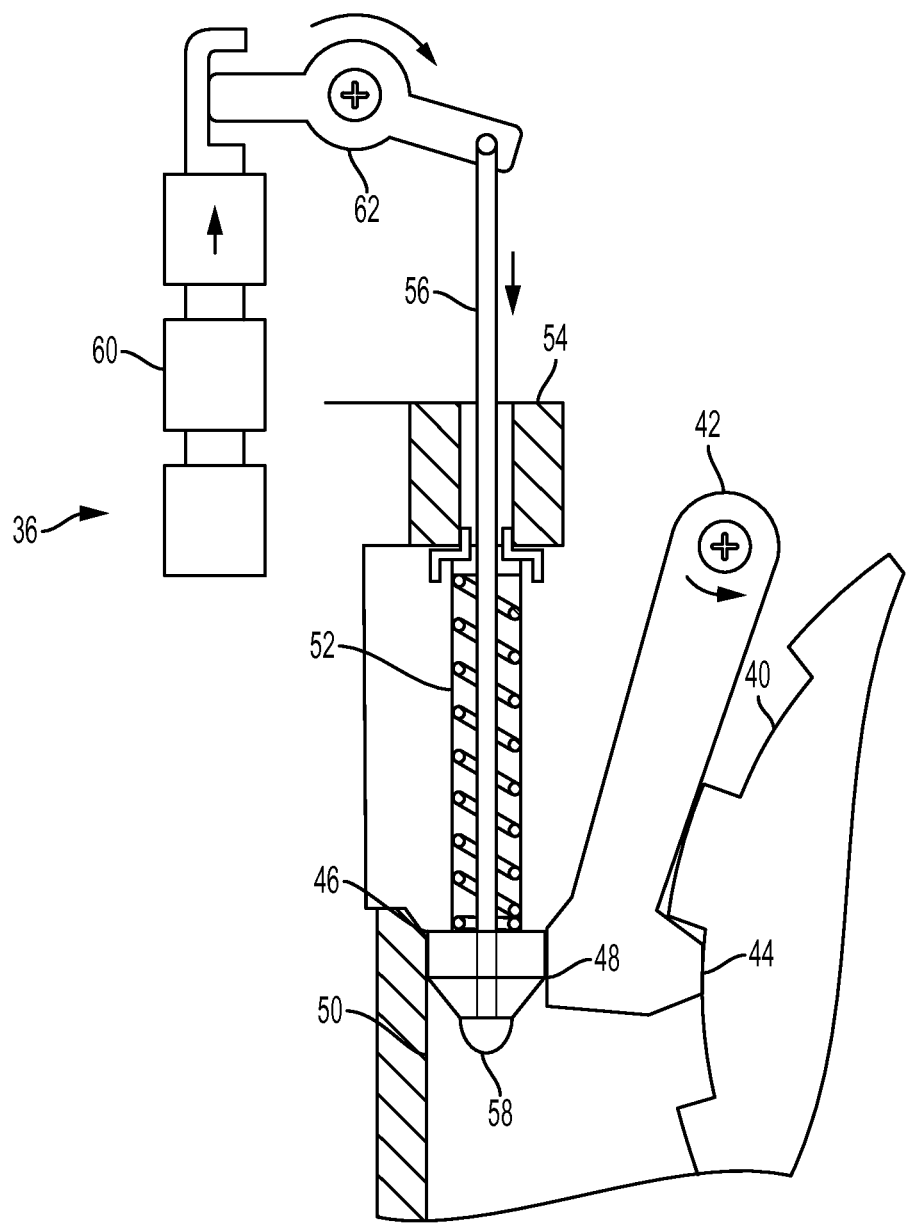
FIG. 2 is a cross section of a park mechanism suitable for use in the transmission of FIG. 1 showing the position of components when Park is engaged.
Figure 3:
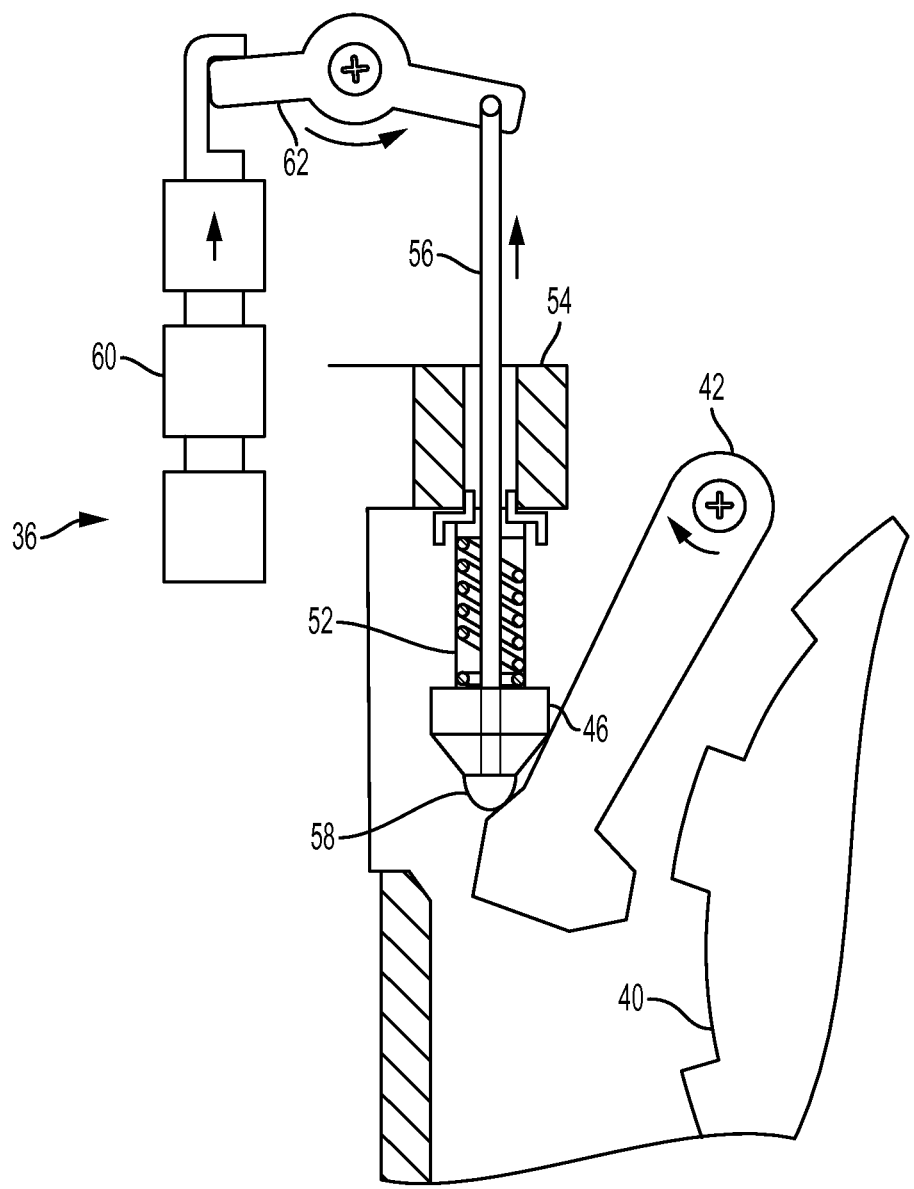
FIG. 3 is a cross section the park mechanism of FIG. 2 showing the position of components when Park is disengaged.
Figure 4:
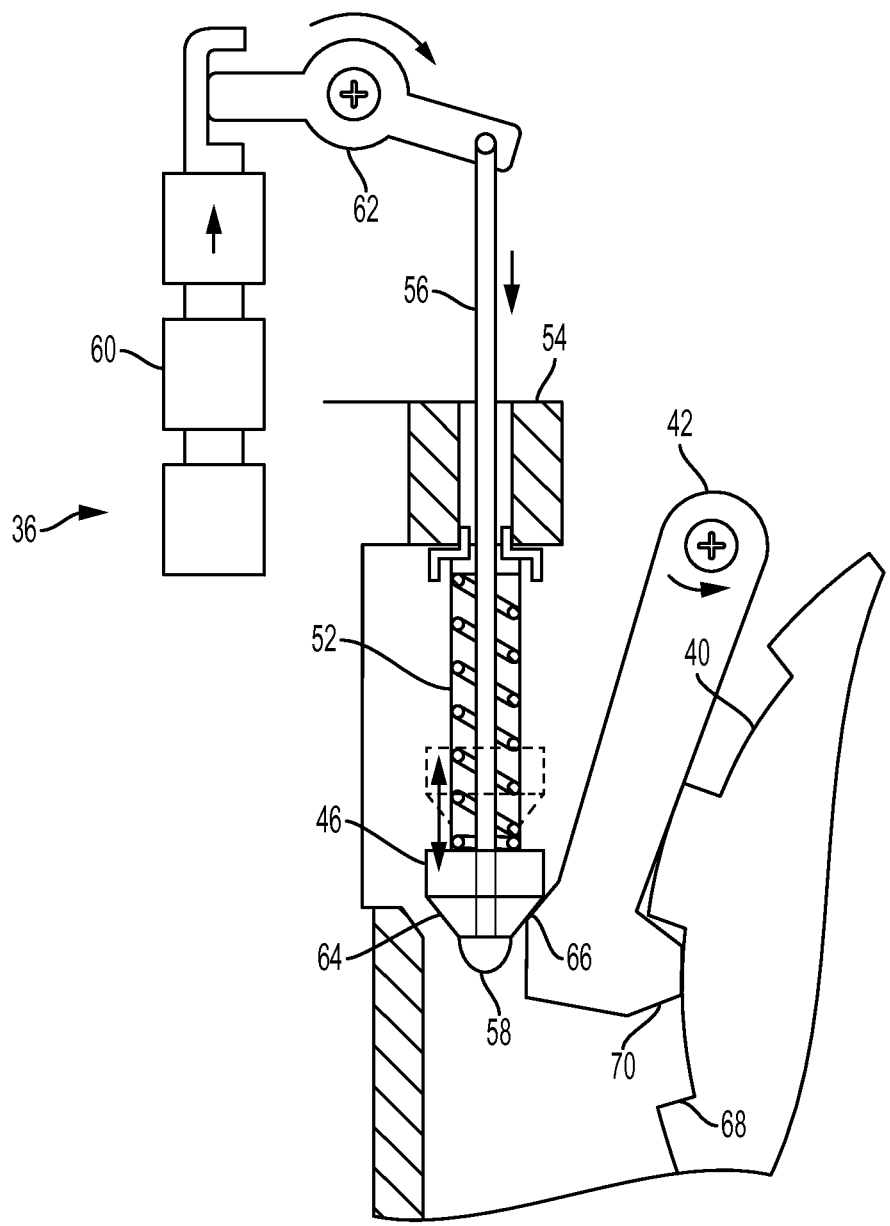
FIG. 4 is a cross section the park mechanism of FIG. 2 showing the position of components when Park has been commanded while the vehicle is moving.

FIGS. 2-4 illustrate a park mechanism suitable for use in the powertrain of FIG. 1. FIG. 2 shows the mechanism when park has been engaged. Park gear 40 is fixed to a shaft that is fixedly driveably connected to the driven vehicle wheels. Two elements are driveably connected when a power flow path is establish between them such that rotation of one requires rotation of the other. For example, park gear 40 may be fixed to the output shaft of transmission 12 which is fixed to driveshaft 22. Driveshaft 22 is drivably connected to driven wheels 26 and 28 collectively (although it is possible for driveshaft 22 to rotate with one of the driven wheels stationary due to the action of differential 24). In a front wheel drive transmission, there may be multiple shafts that are drivably connected to the driven wheels and therefore could be fixed to park gear 40.

A parking pawl 42 is mounted to the transmission case such that it can pivot between the engaged position illustrated in FIG. 2 and a disengaged position. In the engaged position, a tooth of the parking pawl interlocks with teeth of the parking gear 40 to prevent rotation of the parking gear, thereby preventing movement of the vehicle. A cam 46 is positioned between a flat face 48 of parking pawl 42 and an abutment 50 of the transmission case. In this position, the cam prevents pawl 42 from pivoting away from parking gear 40. Compression spring 52 reacts against a flange 54 of the transmission case to push cam 46 toward the position shown in FIG. 2. Cam 46 slides along a rod 56. Stop 58 limits the position of cam 46 relative to rod 56 in one direction. The rod also moves relative to the housing between the park position shown in FIG. 2 and a no-park position. Spring 52, acting through cam 46 and stop 58 biases the rod toward the park position. A first actively controlled hydraulic pressure may also be applied to valve 60 to bias rod 56 toward the park position via linkage 62.

FIG. 3 shows the mechanism when a driving mode other than park, such as drive or reverse, is selected. A second actively controlled hydraulic pressure is applied to valve 60 to bias rod 56, via linkage 62, toward the no-park position shown in FIG. 3. When rod 56 is in this position, stop 58 pulls cam 46 away from pawl 42, compressing spring 52. A torsion spring (not shown) pivots pawl 42 into the disengaged position shown in FIG. 3. In this condition, park gear 40 is free to rotate with respect to the transmission case, so the vehicle is free to move.

If the parking mechanism is suddenly engaged while the vehicle is moving, very high stresses may be exerted on system components, potentially resulting in failures. Since the park mechanism is normally actively controlled, this can generally be avoided by software. However, the mechanism may be mechanically biased to passively enter park if the source of hydraulic pressure fails. Consequently, the mechanism is designed not to engage park when the vehicle speed exceeds a threshold.

FIG. 4 illustrates the state of the park mechanism when park has been selected while the vehicle is in motion. Spring 52 pushes cam 46 to the position shown in FIG. 4. Cam 46, in turn, pushes rod 56 and valve 60 into the positions shown, acting through stop 58 and linkage 62. As the chamfered surface of cam 46 contacts the chamfered surface 64 of the housing and the chamfered surface 66 of pawl 42, it forced pawl 42 toward the engaged position. However, the teeth of parking gear 40 also have chamfered surfaces 68 and the tooth of pawl 42 has chamfered surfaces 70. Rotation of parking gear 40, acting through chamfered surfaces 68 and 66, pivot pawl 42 out of engagement. Cam 46 accommodates this motion of pawl 42 by sliding into a retracted position along rod 56. As different teeth of parking gear 40 contact pawl 42, cam 46 oscillates between an extended position relative to rod 56 and a retracted position relative to rod 56. This mode of operation is called ratcheting. Rod 56 does not need to oscillate to accommodate this motion, isolating valve 60 and linkage 62 from the forces involved. Once the vehicle slows sufficiently, pawl 42 will remain in the engaged position long enough for cam 46 to slide into the engaged position shown in FIG. 2.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a housing;
   a park gear fixedly driveably connected to an output shaft;
   a pawl supported by the housing to pivot between an engaged position in which the pawl engages the park gear to prevent rotation of the output shaft and a disengaged position in which the output shaft may rotate with respect to the housing;
   a rod supported to slide axially with respect to the housing between a park position and a no-park position;
   a cam supported to slide with respect to the rod between an extended position and a retracted position wherein a stop prevents movement beyond the extended position,
      the cam holds the pawl in the engaged position whenever the rod is in the park position with the cam in the extended position, and
      the pawl is free to pivot into the disengaged position whenever the rod is in the no-park position; and
   a spring reacting against the housing, biasing the cam toward the extended position and biasing the rod toward the park position.

2. The transmission of claim 1 wherein the spring is a coil compression spring.

3. The transmission of claim 2 wherein the rod extends through the coil spring.

4. The transmission of claim 1 wherein the park gear has teeth, the pawl has a tooth, and the park gear teeth engage the pawl tooth such that torque on the park gear results in a force to pivot the pawl toward the disengaged position.

5. The transmission of claim 4 wherein the cam includes a first angled surface, the pawl includes a second angled surface, and, while the cam is in an intermediate position between the extended position and the retracted position, the first angled surface engages the second angled surface such that the force to pivot the pawl toward the disengaged position results in a force to push the cam toward the retracted position.

6. The transmission of claim 1 further comprising an actuator configured to pull the rod toward the no-park position.

7. The transmission of claim 6 wherein the actuator is a hydraulic valve.

8. The transmission of claim 6 further comprising a controller programmed to command the actuator to pull the rod toward the no-park position in response to a signal from a shift lever position sensor.

9. A park mechanism comprising:
   a rod supported to slide with respect to a housing between a park position and a no-park position;
   a cam supported to slide with respect to the rod between an extended position and a retracted position wherein a stop prevents movement beyond the extended position; and
   a first spring abutting the housing, biasing the cam toward the extended position and biasing the rod toward the park position.

10. The park mechanism of claim 9 further comprising:
   a pawl supported to pivot between an engaged position in which the pawl engages a park gear to prevent rotation of the park gear and a disengaged position in which the park gear is free to rotate wherein the cam holds the pawl in the engaged position whenever the cam is in the extended position and the rod is in the park position.

11. The park mechanism of claim 10 further comprising a second spring biasing the pawl toward the disengaged position.

12. The park mechanism of claim 9 further comprising an actuator configured to pull the rod toward the no-park position in response to a signal from a controller.

13. A park mechanism comprising:
   a rod supported to move between a park position and a no-park position, the rod having a stop that constrains relative movement of a cam with respect to the rod, the cam configured to slide with respect to the rod and to hold a pawl in engagement with a parking gear when the rod is in the park position and the cam is against the stop; and
   a spring abutting the housing and biasing the rod toward the park position while permitting the cam to move away from the stop to permit rotation of the park gear with the rod in the park position.

14. The park mechanism of claim 13 further comprising an actuator configured to pull the rod toward the no-park position in response to a signal from a controller.

* * * * *